UNITED STATES PATENT OFFICE.

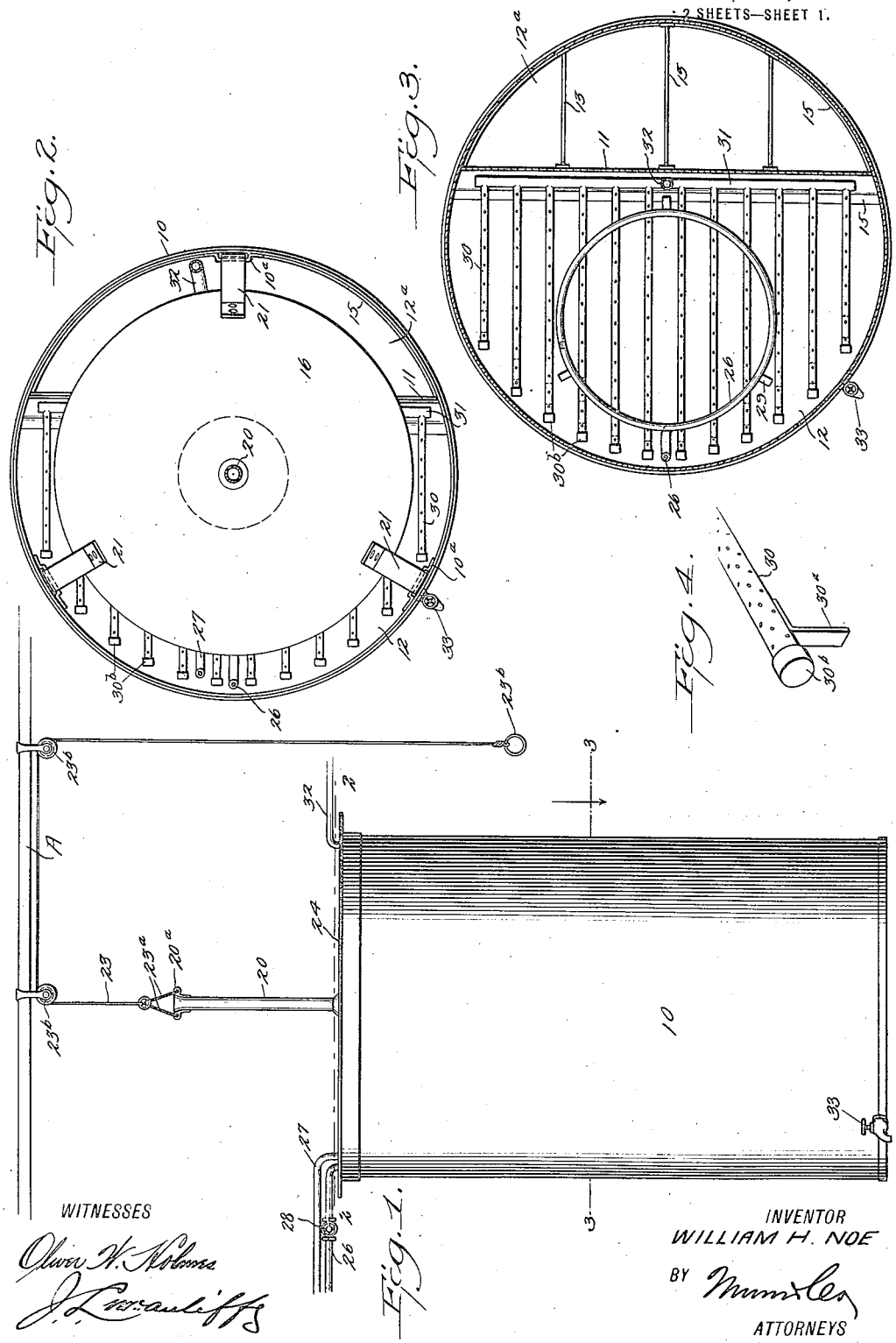

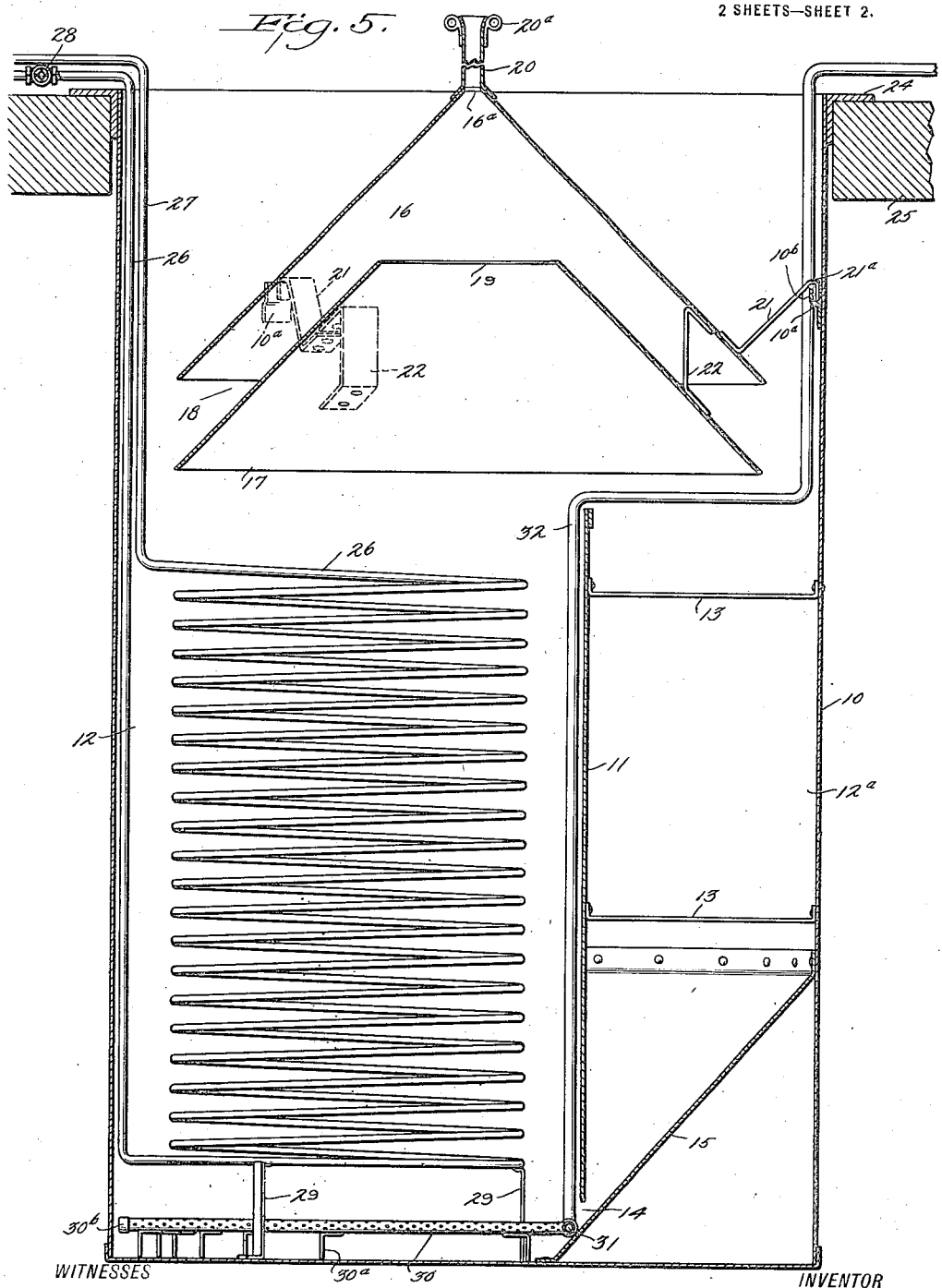

WILLIAM HENRY NOE, OF MONTROSE, NEW YORK.

FERMENTING TANK.

1,402,248.  Specification of Letters Patent.  Patented Jan. 3, 1922.

Application filed December 17, 1919. Serial No. 345,665.

*To all whom it may concern:*

Be it known that I, WILLIAM H. NOE, a citizen of the United States, and a resident of Montrose, in the county of Westchester and State of New York, have invented a new and Improved Fermenting Tank, of which the following is a description.

My invention relates to fermenting tanks and although capable of serving the general purpose of a fermenting tank is more particularly intended for the fermentation of yeast, the foaming of which is particularly persistent and pronounced, making it difficult to confine it to the tank and prevent its overflowing.

The general object of my invention is to provde a tank and appurtenances of a character that will serve effectively to confine the foaming yeast or other fermenting material within the limits of the tank.

A more specific object of the invention is to provide a structural embodiment of my invention reflecting practical considerations with respect to simplicity of construction and the facility of installation adjustment and control.

The nature of the invention and its distinguishing features, as well as the advantages of the preferred structural elements entering into the illustrated practical embodiment of the invention will appear from the specific description following.

Reference is to be had to the accompanying drawings forming a part of this specification, it being understood that the drawings are merely illustrative of one example of the invention.

Figure 1 is a side elevation of a fermenting tank embodying my invention;

Figure 2 is an enlarged sectional plan view, the section being taken on the line 2—2, Figure 1;

Figure 3 is an enlarged horizontal section on the line 3—3, Figure 1;

Figure 4 is a fragmentary view showing a detail of the aerator;

Figure 5 is a transverse vertical section of the tank and its appurtenances on a still larger scale.

In carrying out my invention, a tank 10 is provided of any desired size, the tank in practice to be made in any one of several sizes, as to whether the yeast is to be fermented on a large scale or in comparatively limited quantities as in individual bakeries. I provide a circulating cycle within the tank and for the purpose, in the present example, use is made of a vertical partition 11 at one side of which is the fermenting compartment 12 occupying approximately two-thirds of the cross sectional area of the tank and on the other side a smaller compartment 12$^a$. The partition 11 may be provided with any suitable securing means, there being shown braces 13 between the same and the adjacent side of the tank. The partition 11 extends short of the bottom of the tank to present a transverse return passage 14 and advantageously in the compartment 12$^a$ in the preferred form of my invention, is a bottom or false bottom 15 presenting an incline extending beneath the partition 11 to the main fermenting compartment 12.

With the described arrangement the foaming yeast or the like will rise in the compartment 12 and overflow into the compartment 12$^a$ descending in the latter to the incline 15 and will be directed laterally through the passage 14 to the bottom of the compartment 12 again.

In practice it is exceedingly difficult to keep down the foaming yeast under excessive activity of the fermentation, to a degree to prevent the yeast from overflowing the fermentation tank as usually constructed and I provide means preventing the yeast from escaping over the top of the tank even should the yeast tend to rise to the height of the tank or even above the same. For the purpose I make use of a combined shield and deflector composed of upper and lower members 16, 17, of general conical or equivalent upwardly convergent form, maintained separated to present a downwardly flaring intervening space 18 at all sides thereof, the lower conical element 17 being truncated and presenting a comparatively wide open top 19, while the upper conical element 16 has a comparatively restricted outlet 16$^a$ at the apex leading to a stand pipe 20. In the illustrated example the upper conical element 16 is provided with outwardly directed arms 21 at the upper surface thereof near the lower edge presenting downwardly disposed hooked ends 21$^a$ adapted to rest in fixed brackets 10$^a$ on the tank 10 at the interior, said brackets being offset outwardly at their upper ends as at 10$^b$ to receive said hooks. The elements 16, 17 are maintained separated by any suitable means such as flat posts 22 therebetween and rigidly secured to both. The weight of the combined elements 16, 17 will firmly seat the guard on the brackets 10ª but the cover may be readily lifted from said brackets when desired, to afford access to the parts beneath.

With the described arrangement should the yeast rise above the partition 11 and into the open side of the lower element 17 and through the open top 19 of the latter, to and against the inner surface of the upper guard member 16, is will be deflected downwardly through the space 18 and be returned to the tank. Should the yeast still continue to rise in the guard under exceptional activity of the fermentation process, it will pass into the stand pipe 20 which may be extended to any practical height. Should the yeast overflow the stand pipe 20 which it is not likely to do, it will flow down the exterior of said pipe to the external conical surface of the upper guard element 16 and return to the tank. Any tendency of the yeast to rise in the tank 10 about the exterior of the guard elements 16 and 17 will be overcome and said yeast will be drawn downwardly by the dragging action of the down flowing yeast returning through the space 18.

Any suitable lift means may be provided for raising the described guard; as one means for the purpose eyes 20ª or equivalent members may, as shown, be provided on the stand pipe 20, adapted to receive hooks 23ª on a rope or cable 23 extending over pulleys 24ᵇ on a ceiling beam A, the rope being of a length so that its depending free end may be provided with a ring 23ᵇ or other handhold in convenient reach of the attendant for exerting a pull thereon for the raising of the guard.

The tank, in practice, as will be readily understood, may be supported in any desired practical manner, there being provided in the illustrated form of the invention an outwardly directed top flange 24 on the tank at the top adapted to rest on any fixed structure conventionally indicated at 25.

In practice, any suitable provision may be made for cooling the fermentation compartment 12 and I have illustrated for the purpose a cooling coil 26 in the present example of the invention, said coil being disposed in said compartment 12, its inlet and outlet pipes 26, 27 extending to the top of the tank and laterally to any desired point connecting with any convenient source of water or other cooling fluid. The inlet pipe may have a cut-off valve 28 at a suitable point therein. The coil may be supported at the bottom in any approved means, there being indicated supports 29 on which the bottom convolution of the coil rests. A drainage or clean-out cock 33 is in practice provided at the bottom of tank 10.

To aerate the yeast in the compartment 12 and to assist in inducing a circulation of the yeast or other material therein, I provide an aerator in the form of perforated pipe elements 30 here shown as arranged parallel in the bottom of the tank. Said elements 30 may, as shown, be provided with legs 30ª. The perforated elements 30 connect with a header 31 disposed horizontally in the tank and connecting with supply pipe 32 extending into the tank at the top from any convenient means (not shown) for supplying air under sufficient pressure to pass into and through the aerating elements 30 for rising in the yeast in the compartment 12. The outer ends of the aerating elements 30 are preferably capped as at 30ᵇ. Said aerating elements 30 advantageously are disposed below the return passage 14 leading from the second compartment 12ª so that the air rising from said aerating members will the better tend to induce a circulation through said return passage into the fermentation compartment 12 and upwardly in the latter. From the foregoing, it will be seen that a very effective circulation of the material undergoing fermentation will be obtained, due to the external circuit provided by the compartment 12ª and by the action of the air escaping from the aerating elements.

I would state in conclusion that while the illustrated example constitutes a practical embodiment of my invention, I do not limit myself strictly to the mechanical details as herein illustrated, since manifestly the same can be considerably varied without departure from the spirit of the invention as defined in the appended claims.

Having thus described my invention, I claim:

1. An apparatus for use in the treatment of material having a tendency to rise, said apparatus including a tank, and guard means therein adjacent to the top and presenting an escape opening for the rising material as well as a deflecting surface above said opening to arrest the rising of the material undergoing treatment and deflect the same downwardly to return it to the tank.

2. A fermentation tank, and guard means at the top thereof presenting a deflecting surface and having therein a return passage beneath the deflecting surface whereby to arrest the rising of the material undergoing fermentation and return it to the tank.

3. A fermentation tank and guard means at the top thereof presenting a deflecting surface and a return passage beneath said surface whereby to arrest the rising of the material undergoing fermentation and return it to the tank, said guard below said passage being of smaller diameter than the tank to present an open space therebetween.

4. A fermentation tank, and a guard below the top thereof to arrest the rising of the material undergoing fermentation, said guard including upper and lower spaced upwardly convergent elements presenting a return passage therebetween.

5. A fermentation tank, and a guard below the top thereof to arrest the rising of the material undergoing fermentation, said guard including a lower truncated conical element having an open top, and a deflecting element above and spaced from the first element.

6. A fermentation tank, and a guard therein adjacent to the top thereof to arrest the rising of the material undergoing fermentation, said guard including a lower upwardly convergent element having an open top, and a second upwardly convergent element above and spaced from the first element; together with a stand pipe rising from said upper element at the apex thereof, said stand pipe being open at the top to permit overflow onto the exterior of said upper element.

7. A fermentation tank, and a guard below the top thereof to arrest the rising of the material undergoing fermentation, said guard including upper and lower spaced upwardly convergent elements, the lower one having an opening at the top and the two forming an intermediate return space, communicating at the lower end with the interior of the tank.

8. A fermentation tank, and a guard therefor to arrest the rising of the material undergoing fermentation, said guard including a lower upwardly convergent element open at the top, and a second upwardly convergent element above the lower element and spaced therefrom to present a return passage between said elements; together with supporting means comprising hangers on said guard and brackets on the tank at the interior forming rests for said hangers.

9. A fermentation tank, and a guard therefor to arrest the rising of the material undergoing fermentation, said guard including a lower upwardly convergent element open at the top, and a second upwardly convergent element above the lower element and spaced therefrom to present a return passage between said elements; together with supporting means comprising hangers on said guard, and brackets on the tank at the interior forming rests for said hangers, and lift means secured to said guard.

10. A fermentation tank having a partition dividing the same into a fermentation compartment, and a second compartment at a side of the fermentation compartment and communicating therewith at the top and bottom to form a circulating circuit for the material being fermented; together with oblique deflecting means in the second compartment at the bottom thereof for directing the material to the fermentation compartment at the bottom thereof.

11. A fermentation tank and a guard therein near the top to arrest the rising of the material undergoing fermentation, said guard including a lower upwardly convergent element having an open top, and a deflecting element above and spaced from the first element, said deflecting element being convergent to extend over the open top of the first element and there being a space between said elements in communication at the bottom of said guard with the interior of the tank.

WILLIAM HENRY NOE.